(12) United States Patent
Naunheimer et al.

(10) Patent No.: US 7,841,807 B2
(45) Date of Patent: Nov. 30, 2010

(54) METHOD OF TRANSFERRING PARTICLES

(75) Inventors: Christopher Naunheimer, Arlington Heights, IL (US); Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 26 days.

(21) Appl. No.: 12/261,115

(22) Filed: Oct. 30, 2008

(65) Prior Publication Data

US 2010/0111618 A1    May 6, 2010

(51) Int. Cl.
    *B65G 53/00* (2006.01)
(52) U.S. Cl. .................. 406/197; 406/12; 406/34; 406/198; 208/173; 208/176
(58) Field of Classification Search ............ 406/12, 406/22, 23, 34, 192, 197, 198; 414/217, 414/220; 208/173, 176, 147
    See application file for complete search history.

(56) References Cited

U.S. PATENT DOCUMENTS

| | | | | |
|---|---|---|---|---|
| 2,562,804 A | * | 7/1951 | Martin et al. .................. 502/38 |
| 2,705,080 A | * | 3/1955 | Hicks .......................... 414/220 |
| 2,851,401 A | * | 9/1958 | Payne .......................... 208/173 |
| 2,851,402 A | * | 9/1958 | Haddad ........................ 208/175 |
| 2,985,324 A | * | 5/1961 | Balentine ..................... 414/217 |
| 3,067,131 A | * | 12/1962 | Bergstrom .................. 208/173 |
| 3,692,496 A | | 9/1972 | Greenwood et al. ........ 23/288 G |
| 3,725,249 A | | 4/1973 | Vesely et al. ................ 208/139 |
| 3,745,112 A | | 7/1973 | Rausch ........................ 208/139 |
| 4,035,153 A | | 7/1977 | Bunn, Jr. et al. ........... 23/288 B |
| 4,108,500 A | * | 8/1978 | Stamer ......................... 406/12 |
| 4,341,740 A | * | 7/1982 | Greenwood ................. 422/310 |
| 4,401,402 A | | 8/1983 | Casperson .................. 414/218 |
| 4,403,909 A | * | 9/1983 | Greenwood ................. 414/805 |
| 4,430,517 A | | 2/1984 | Imai et al. .................... 585/660 |
| 4,576,712 A | | 3/1986 | Greenwood ................. 208/138 |
| 4,578,370 A | | 3/1986 | Greenwood ................. 502/37 |
| 4,615,792 A | | 10/1986 | Greenwood ................. 208/134 |
| 4,654,455 A | | 3/1987 | Chao .......................... 585/415 |
| 4,746,763 A | | 5/1988 | Kocal .......................... 585/417 |
| 4,758,118 A | * | 7/1988 | Rachner et al. ............... 406/24 |
| 4,872,969 A | | 10/1989 | Sechrist ...................... 208/173 |
| 5,076,908 A | | 12/1991 | Strangeland et al. ........ 208/148 |
| 5,143,521 A | * | 9/1992 | Dewitz ....................... 48/210 |
| 5,338,440 A | | 8/1994 | Sechrist et al. ............. 208/173 |
| 5,500,110 A | | 3/1996 | Sechrist et al. ............. 208/173 |

(Continued)

OTHER PUBLICATIONS

Jenike, A.W., "Storage and Flow of Solids" Bulletin No. 123, Utah Engineering Experiment Station, University of Utah, Salt Lake City, Utah; vol. 53, No. 26, Sixth Printing (revised) Mar. 1970.

(Continued)

*Primary Examiner*—Joe Dillon, Jr.
(74) *Attorney, Agent, or Firm*—David J Piasecki

(57) ABSTRACT

Method and apparatus are provided for transferring particles from an upper zone through an intermediate zone to a lower zone. The transfer of particles between the zones through valveless conduits is regulated by varying the pressure of the intermediate zone and the flow rate of gas passing through the valveless conduits. A container within the second zone is in particle communication with a valveless conduit and provides more consistent particle flows.

20 Claims, 5 Drawing Sheets

U.S. PATENT DOCUMENTS

| | | | |
|---|---|---|---|
| 5,545,312 A | 8/1996 | Lawrence et al. | 208/152 |
| 5,558,472 A * | 9/1996 | Ogawa et al. | 406/12 |
| 5,584,615 A | 12/1996 | Micklich | 406/109 |
| 5,707,198 A | 1/1998 | Vind | 414/219 |
| 5,716,516 A | 2/1998 | Micklich | 208/174 |
| 5,840,176 A | 11/1998 | Lawrence et al. | 208/152 |
| 5,858,210 A | 1/1999 | Richardson | 208/173 |
| 5,916,529 A * | 6/1999 | Scheuerman | 422/141 |
| 6,034,018 A | 3/2000 | Sechrist et al. | 502/35 |
| 6,395,664 B1 * | 5/2002 | Boehner et al. | 502/22 |
| 6,461,992 B1 | 10/2002 | Sechrist et al. | 502/35 |
| 6,657,096 B2 | 12/2003 | Boehner et al. | 585/418 |
| 6,969,496 B2 | 11/2005 | Vetter et al. | 422/221 |
| 6,994,497 B1 * | 2/2006 | Eriksson et al. | 406/124 |
| 7,172,685 B2 * | 2/2007 | Thompson et al. | 208/208 R |
| 7,600,950 B2 * | 10/2009 | Yuan | 406/156 |

OTHER PUBLICATIONS

U.S. Appl. No. 11/832,008, filed Aug. 1, 2007, David J. Fecteau et al.
U.S. Appl. No. 11/832,059, filed, Aug. 1, 2007, David J. Fecteau et al.
U.S. Appl. No. 12/261,109, filed Oct. 30, 2008, Christopher Naunheimer et al.
U.S. Appl. No. 12/332,559, filed Dec. 11, 2008, Christopher Naunheimer et al.
U.S. Appl. No. 12/332,564, filed Dec. 11, 2008, Christopher Naunheimer et al.
U.S. Appl. No. 12/273,689, filed Nov. 19, 2008, Christopher Naunheimer et al.
U.S. Appl. No. 12/332,567, filed Dec. 11, 2008, Christopher Naunheimer et al.
U.S. Appl. No. 12/361,181, filed Jan. 28, 2009, Christopher Naunheimer et al.
U.S. Appl. No. 12/340,842, filed Dec. 22, 2008, Christopher Naunheimer et al.
U.S. Appl. No. 12/361,186, filed Jan. 28, 2009, Christopher Naunheimer et al.

* cited by examiner

METHOD OF TRANSFERRING PARTICLES

FIELD OF THE INVENTION

This invention generally relates to the art of solid particle transport. More specifically, the invention relates to methods and apparatus for transferring particles from an upper zone through a middle zone to a container within a lower zone.

BACKGROUND OF THE INVENTION

There are many chemical processes where it is necessary to bring into contact a fluid and a solid particulate matter, such as adsorbents and catalysts. Frequently, chemical reactions as well as physical phenomena occur for a predetermined period of time in the contact zone, e.g. a reaction or adsorption zone. In many of these processes, the particles are transported between two or more particle containing vessels. The particles may be transported for a variety of reasons depending on the process. For example, particles may be transported from one contacting vessel or zone into another contacting zone in order to take advantage of different process conditions to improve product yields and/or purity. In another example, particles may be transported from a reaction zone into a regeneration zone in order to rejuvenate the particles, and after rejuvenation, the particles may be transported back to the reaction zone. The particles may be introduced to and withdrawn from the vessels or zones in a continuous or semi-continuous manner sufficient to maintain the desired contacting process continuously.

The vessels between which the catalyst is transported are not necessarily adjacent. The outlet of the source vessel from which the catalyst is transported may be a significant distance horizontally and/or vertically from the inlet of the destination vessel to which the catalyst is transported. Pneumatic conveying through a conduit is a well known and commonly used method of transferring catalyst over vertical and horizontal distances. One characteristic of pneumatic conveying is that because of the pressure difference across the conduit between the source and destination, the destination pressure must be less than the source pressure to account for the pressure drop across the pneumatic conveying system. However, process conditions may require the destination vessel to operate at a higher pressure than this value (source pressure minus pneumatic conveying system pressure drop). Examples include circulating particles between two zones maintained at different pressures; and transferring particles from one vessel to another where both vessels are maintained at the same pressure. Under such conditions, a pneumatic conveying system alone is insufficient to transfer the particles.

A lock hopper is commonly used to transfer particles from a lower pressure zone to a higher pressure zone. The use of lock hoppers in conjunction with pneumatic conveying is also well known in the art to transfer particles between vessels or zones that are maintained at different pressures. First, a lock hopper transfers particles from the upper, low pressure source zone to a middle zone, and then to a lower, high pressure zone. A pneumatic conveying system then transfers the particles from the high pressure zone to the destination zone. Although the destination zone has a pressure less than that of the high pressure zone, the destination zone pressure may be greater than that of the low pressure source. In the art, the term "lock hopper" has been used to designate the combination of the upper, middle, and lower zones, and "lock hopper" has been used to designate only the middle zone.

In one example, the flow of particles from an upper vessel into the middle zone and out of the middle zone into a lower zone is controlled by valves located in the conduits or transfer pipes that connect the zones. The valves may be double block-and-bleed ball valves. Thus, a batch of particles may be transferred to the middle zone through the upper valve or valves when the lower valve or valves are closed. The middle zone may then be isolated by closing the upper valve(s). Various conduits may be connected to the isolated volume to introduce or remove the fluid phase, usually gas, or change the pressure inside the middle zone. For example, a regenerated catalyst may enter the vessel, be purged with nitrogen to remove oxygen, and pressured with hydrogen before being transferred to the reactor which is at a higher pressure than the regenerated catalyst. After catalyst exits the middle zone, the middle zone can be purged with nitrogen to remove the hydrogen before filling again with catalyst.

U.S. Pat. No. 4,576,712 discloses a method and apparatus for maintaining a substantially continuous gas flow through particulate solids in two zones. The solids are moved from a low pressure zone to a high pressure zone by means of a valveless lock hopper system. Maintenance of gas flow while simultaneously transferring particles between zones is accomplished without the use of moving equipment such as valves.

U.S. Pat. No. 4,872,969 discloses a method and apparatus for controlling the transfer of particles between zones of different pressure using particle collection and particle transfer conduits. The solids are moved from a low pressure zone to a high pressure zone by means of a valveless lock hopper system that vents all of the gas from the collection zones through the particle collection conduits. The venting of gas is accomplished by varying the size of the transfer conduits between zones.

As is known in the art, physical characteristics of the particles and basic process information such as the operating pressure in the upper and lower zones and the acceptable range of gas flow rates are initial design information. Processes are designed from this basic information and standard particle and gas engineering principles to routinely provide stable operating units. Surprisingly, it has been found that a particular unit will operate predominantly in a stable manner but experience sporadic upsets. These upsets involving a sudden surge of particles from one zone to another, which may reverse the particle flow, have been unpredictable with respect to which unit will be affected, and which particle transfer cycle will experience an upset in an affected unit. These upsets occur despite conformance to the same design methods. Such upsets interrupt the consistent flow of particles and can physically damage the particles as well as the equipment.

Consequently, there is desire to eliminate these sporadic upsets in order to minimize damage to the equipment and particles and ensure the consistent flow of particles. The consistent flow or transfer of particles involves a series of steps which are repeated in a cyclic manner to transfer the particles in batches. Although it remains unpredictable whether an upset will occur during any particular cycle in an apparatus, we have discovered that the upsets usually occur during the middle zone depressurization step or the middle zone empty step. Our invention provides an improved method and apparatus that eliminates all or many of these sporadic upsets without negatively impacting the vast majority of operating units or cycles that do not experience upsets.

SUMMARY OF THE INVENTION

The invention is a method and apparatus for transferring particles from an upper zone through a middle zone to a lower zone where the zones are connected by valveless conduits.

The lower zone may have a higher pressure than the upper zone. A container within the lower zone is in particle communication a valveless conduit. The transfer of particles from the upper zone to the container within lower zone is controlled by varying the pressure of the middle zone and the flow rates of gas passing upwards through the valveless conduits. The container retains at least a portion of the particles before they are passed through a container outlet to the volume of the lower zone outside the container.

In a broad embodiment, the invention is a method for transferring particles from an upper zone, through a middle zone, to a lower zone comprising: introducing a first gas stream into the lower zone; transferring particles downward from the upper zone to the middle zone through an upper valveless conduit, and transferring a second gas stream from the lower zone upward through a lower valveless conduit into the middle zone; increasing the middle zone pressure; transferring particles downward from the middle zone, through the lower valveless conduit to a container within the lower zone, and transferring a third gas stream from the middle zone upward through the upper valveless conduit into the upper zone; decreasing the middle zone pressure; and transferring particles from the container to a volume of the lower zone outside the container.

In another broad embodiment, the invention is an apparatus comprising: an upper zone; a middle zone; a lower zone; a container located within the lower zone, the container comprising an inlet and an outlet; an upper valveless conduit extending from the upper zone to the middle zone; a lower valveless conduit extending from the middle zone to the lower zone, the lower valveless conduit providing particle communication to the container; a gas inlet conduit providing fluid communication to the lower zone; and a first gas conduit in fluid communication with the middle zone.

Figure 1:
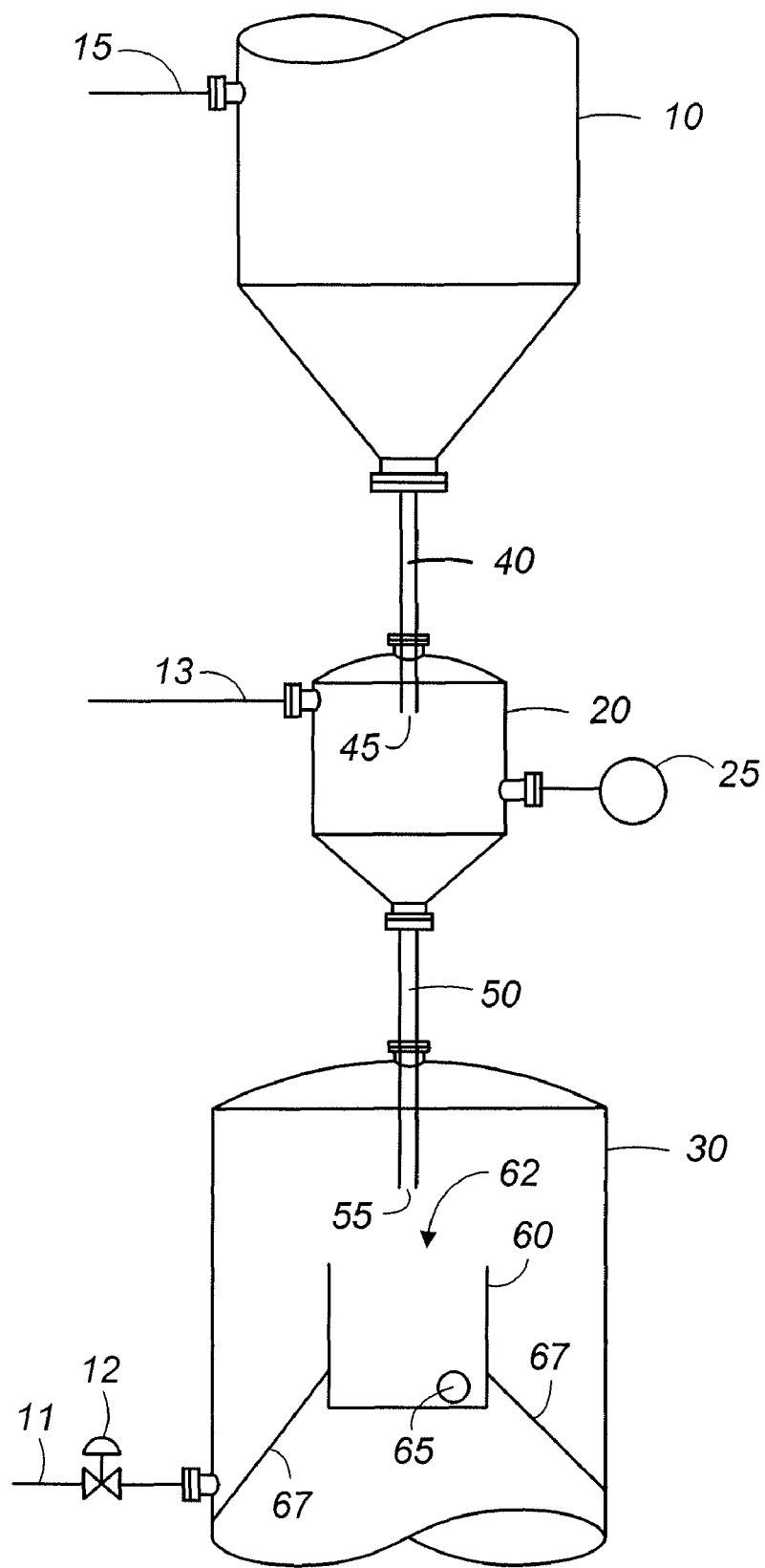
FIG. 1 is a representative view depicting the zones of the apparatus in different vessels and an embodiment of the container in the lower zone.

The Figures are intended to be illustrative of the invention and are not intended to limit the scope of the invention as set forth in the claims. The drawings are simplified diagrams showing exemplary embodiments helpful for an understanding of the invention. Details well known in the art, such as cone deflectors, control valves, instrumentation, and similar hardware which are non-essential to an understanding of the invention may not be shown.

DETAILED DESCRIPTION OF THE INVENTION

The invention may be used to transfer solid particulate matter from an upper zone, through a middle zone, to a lower zone where the lower zone pressure is greater than the upper zone pressure. The invention transfers particles without using moving equipment such as valves to block the particle flow path. Generally, particles received in an upper zone are transferred through an upper valveless standpipe or transfer conduit to a middle zone. A lower valveless standpipe or transfer conduit is used to transfer the particles from the middle zone to a container located within a lower zone. Thus the zones, valveless conduits, and container may be in particle communication and the valveless conduits may provide particle communication.

The invention can be used within and/or between a variety of process units to transfer particles, such as catalyst and adsorbents. The upper zone of the invention may receive particles from a separate process zone and the lower zone may deliver the particles to another separate process zone. For example, an associated process unit may include a separate vessel that operates as a reaction zone which provides catalyst particles to the upper zone, and the lower zone may deliver catalyst to a separate process vessel such as a feed hopper of a pneumatic conveying apparatus which in turn delivers the catalyst to the top of another reactor. In another embodiment, the invention may be arranged so that the upper zone and/or the lower zone are integrated with a process unit such that one or more process steps, or portions thereof, occurs within the upper and/or lower zones or the vessel(s) which contain the upper and/or lower zones. For example, the upper zone may be the lower portion of a reduction zone vessel or the entire reduction zone vessel of a process unit and/or the lower zone may be the upper portion of a surge vessel or the entire surge vessel of a process unit. The surge vessel in turn may introduce the particles into other zones of the same or a different process unit.

The invention may communicate with or the invention may comprise a portion of a process unit which provides for changing the fluid that contacts the particles. For example, the process unit may involve contacting catalyst with a gas containing hydrocarbons and/or hydrogen in a reaction zone and removing carbon deposits from the catalyst using a gas containing oxygen in a regeneration zone. As the catalyst is transferred between the reaction and regeneration zones, care must be taken to prevent mixing of the hydrocarbon/hydrogen atmosphere and the oxygen atmosphere. Examples of hydrocarbon conversion processes that may employ the invention include: alkylation, hydrorefining, hydrocracking, dehydrogenation, hydrogenation, hydrotreating, isomerization, dehydroisomerization, dehydrocyclization, and steam reforming. One widely practiced hydrocarbon conversion process that may employ the invention is catalytic reforming using particles of catalyst. Exemplary reaction and regeneration zones are disclosed in, e.g., U.S. Pat. No. 5,858,210.

The upper, middle, and lower zones of the invention may be separate vessels or portions of separate vessels that are connected by valveless transfer conduits. In other embodiments, two or more of the upper, middle, and lower zones may be contained within a single vessel and separated by dividers within the vessel. The upper, middle, and lower zones of the invention may also provide one or more functions or process steps of an associated process unit. In an embodiment, the upper, middle, and lower zones may be aligned sufficiently vertically to allow catalyst to flow, at least in part, by gravity from at least one vessel at a higher elevation to at least one vessel at a lower elevation.

Flow of the particles into and out of the middle zone may be controlled by regulating the pressure of the middle zone, the flow rate of gas through each valveless particle transfer conduit, and the gas flow path. The same basic method steps may be accomplished by various configurations of gas and particle conduits to introduce, vent, and change the flow path of the gas used to control particle transfers. U.S. Pat. No. 4,576,712 and U.S. Pat. No. 4,872,969 disclose different methods and apparatus to control particle transfer and are hereby incorporated by reference in their entirety. The invention may use the same basic method steps and is not limited to any particular configuration of the gas flow path and conduits. Existing configurations and control schemes can be readily adapted to employ the invention.

The method of transferring particles from upper zone 10 to lower zone 30 may be accomplished without blocking the particle transfer path with moving equipment such as valves by repeating the following four step cycle: 1) a fill or load step wherein particles are transferred from the upper zone to the middle zone; 2) a pressurization step wherein the middle zone pressure is increased; 3) an empty step wherein particles are transferred from the middle zone to the container within the lower zone; and 4) a depressurization step wherein the middle zone pressure is decreased. The steps may overlap. For example, transfer of particles may begin while the middle zone pressure continues to increase or decrease and the middle zone pressure may begin to increase or decrease while particles continue to transfer.

A single cycle results in the transfer of one batch of particles from the upper zone to the lower zone. The time required to complete one cycle, i.e. the cycle time, will depend on a variety of factors including: the properties of the particles; the batch size, or amount of particles transferred per cycle; and the times needed to change the pressure of the middle zone. The invention is not limited by the cycle time. In an embodiment, the cycle time may be about 50 seconds. In another embodiment, the cycle time may be less than about 10 minutes, and the cycle time may be between about 2 minutes and about 4 minutes. A controller such as process control computers and programmable controllers may be used to regulate the cycle. The controller may receive various inputs, e.g. signals from particle level sensors, pressure gauges or indicators, differential pressure sensors, and timers such as for an individual step and/or the overall cycle. The controller may also send signals for example to open, close, and adjust valves to control the flow pattern and rate of various gas steams. Such a controller and related signals are not shown in the figures as they are not essential to the invention and are well known to the skilled artisan.

Broad embodiments of the invention will now be described with reference to FIG. 1. In step 1 of the method, particles are transferred from upper zone 10 to middle zone 20 through upper valveless conduit 40. The upper and middle zones are at approximately the same pressure during step 1. Gas ascending through upper valveless conduit 40, if any, is insufficient to retain the particles in conduit 40. During step 1, gas may enter lower zone 30 through gas inlet conduit 11. Gas may also enter lower zone 30 from an associated process zone, not shown. Valve 12 may regulate the quantity of gas flowing into lower zone 30; this flow rate may be varied independently of the invention by means, not shown, for controlling the pressure of lower zone 30. The gas is selected to be compatible with the particles being transferred and may be the same gas as used in the associated process unit. Nitrogen, hydrogen, and air are non-limiting examples of gas that may be used.

Figure 2:
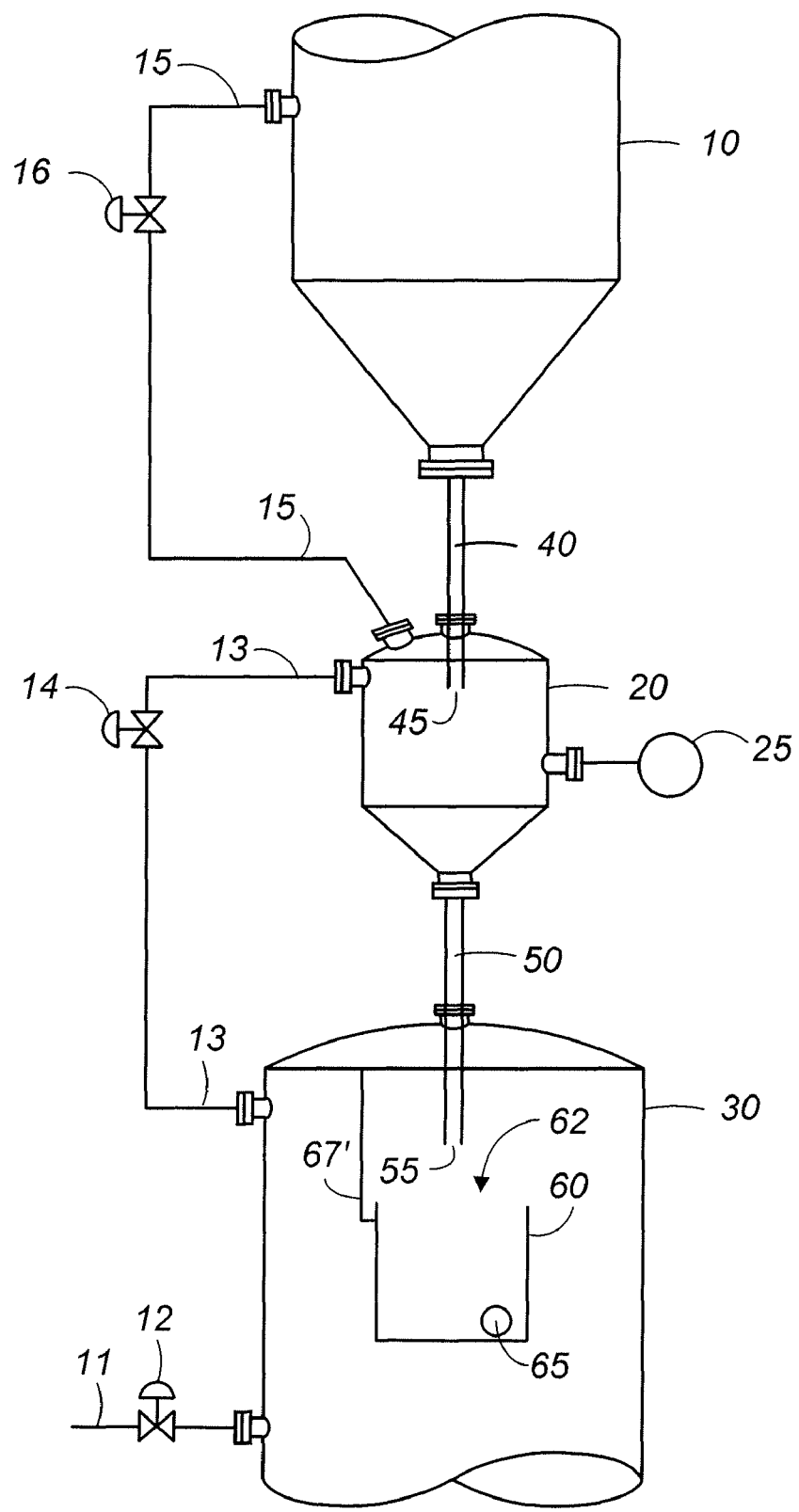
FIG. 2 is a representative view depicting a particular arrangement of gas conduits used in an embodiment of the invention.

During step 1, gas flows upward from lower zone 30 through lower valveless conduit 50 at a sufficient rate to retain the particles in conduit 50 thus causing middle zone 20 to fill with particles. Various configurations of the gas flow path may be used. For example, a portion of the gas entering middle zone 20 from lower valveless conduit 50 may flow through gas conduit 15 to upper zone 10 as shown in FIG. 2. In other embodiments not illustrated, a portion of the gas may flow through gas conduit 15 to another destination or simply be vented. In the embodiment illustrated in FIG. 3, which depicts the three zones of the apparatus in one vessel, upper valveless conduit 40 has a larger diameter than lower valveless conduit 50 so that all gas entering middle zone 20 may flow through upper valveless conduit 40 at a flux which is insufficient to retain the catalyst therein.

Upper 40 and/or lower 50 valveless particle transfer conduits may have a restriction, that is, a smaller cross-sectional area for particle flow than the balance of the respective conduit. The cross-sectional areas of the restrictions if present and the balance of the conduit may be any regular or irregular shape including a circle, oval, square, rectangle, and triangle. The cross-sectional area shape of a conduit may be the same or it may differ over its length and may be the same or different in the upper 40 and lower 50 valveless conduits. The cross-sectional area of a restriction and the balance of the conduit may have different shapes or the same shape. The restriction may be located in a lower portion of the conduit, that is, in the lower ⅓ of the respective conduit's height. The restrictions may be created in a wide variety of ways including crimping the conduit, using an insert, and forming the conduit with the restriction. Restrictions may be located proximate an outlet in the lowermost end of the conduit. In an embodiment, the conduit, or a portion thereof is tapered toward the outlet to form the restriction at the outlet. The type, cross-sectional area shape, and/or location of restrictions in upper 40 and lower 50 valveless conduits may be the same, or they may differ.

Step 1 ends when middle zone 20 is filled to its operating capacity with particles. As shown in FIG. 1, upper valveless conduit 40 may extend into middle zone 20 to define its operating capacity. That is, particles stop flowing into the middle zone when particles in the middle zone accumulate to reach upper valveless conduit outlet 45. Thus, there may be a continuous mass of particles from a lower portion of upper zone 10 through upper valveless conduit 40, middle zone 20, and lower valveless conduit 50. In another embodiment, the operating capacity of middle zone 20 is predetermined and an optional upper level sensor, not show, is used to detect when particles rise to this preset level. In such an embodiment, particles need not reach upper valveless conduit outlet 45 and upper valveless conduit 40 need not extend past the shell of middle zone 20. In other embodiments, the operating capacity of middle zone 20 may be determined by a preset time interval. Use of an adjustable timing interval or high level set point enables the size of each particle batch to be varied from cycle to cycle. The particle levels and/or time increments may be measured and a signal sent to a controller to initiate step 2 when the middle zone has been filled. Thus, particles may continue to flow into middle zone 20 for a time after step 2 begins if the particles are below upper valveless conduit outlet 45 at the end of step 1. In other embodiments, the particle flow may be stopped at this point in the cycle and the apparatus may be held with middle zone 20 filled to its operating capacity until it is desired to continue the particle transfer cycle. This portion of the cycle may also be known as a separate hold or ready step. For example, in the embodiment of FIG. 2, valve 16 is closed to force all the gas upwards through both valveless conduits thereby stopping particles from flowing out of both the upper and middle zones. Similarly, in the embodiment of FIG. 3, valve 14 can be opened in addition to valve 12 to accomplish the same effect.

In step 2 of the cycle, the pressure within middle zone 20 is increased. The middle zone pressure may be increased to stop the transfer of particles from the upper zone. In an embodiment, the middle zone pressure is increased to equilibrate with the higher pressure in lower zone 30. This may be accomplished by introducing gas into middle zone 20 through gas conduit 13. Gas to gas conduit 13 may be supplied from a variety of sources including, but not limited to: gas inlet conduit 11, lower zone 30, and separate supply sources such as facility headers and other zones in the associated or other process units. In the embodiment illustrated in FIG. 2, valve 14 is opened and valve 16 is closed to pressurize middle zone 20. In the embodiment shown in FIG. 3, middle zone 20 is pressurized by opening valve 14 and closing valve 12. There is no need to change the gas flow path as the cycle moves from step 2 to step 3. However, as explained above there are numerous ways of routing the gas flow path to control the desired particle movement. Thus, the invention encompasses changing the gas flow path between and/or within steps 2 and 3 to equilibrate the middle and lower zone pressures and retain particles within upper valveless conduit 40.

Step 3 may be referred to as the empty step of the cycle. As the pressures in the middle and lower zones equalize, particles begin to flow from middle zone 20 through lower valveless conduit 50 to container 60 which is located within lower zone 30. During step 3, gas flows upward through upper valveless conduit 40 at a sufficient rate to prevent to prevent the transfer of particles from upper zone 10 into middle zone 20. The level of particles in middle zone 20 falls as particles flow out of lower valveless conduit 50. A minimum particle level in middle zone 20 may be used to decrease the length requirement of lower valveless conduit 50. This may be accomplished in various ways such as using a preset time interval for the transfer, measuring the amount of particles that have entered lower zone 30, and measuring the level of particles remaining in middle zone 20. For example, low level sensor 25 may detect the absence of particles at the low level set point and send a signal to a controller to begin depressurizing or venting the middle zone, step 4. Multiple inputs may be used to manage the particle transfer cycle steps. In an embodiment, the length of step 3 may be controlled by a timer with low level sensor 25 being used initiate step 4 early if the particles fall below the minimum level set point.

In step 4, the depressurization step, the pressure in middle zone 20 may be decreased to equilibrate the middle and upper zone pressures. In another embodiment, the middle zone pressure may be decreased to stop the transfer of particles from the middle zone. This may be accomplished for example by re-establishing the gas flows that were used in step 1. Thus, in the embodiment of FIG. 2 valve 14 may be closed and valve 16 opened so that the gas flux upward in lower valveless conduit 50 is sufficient to retain particles therein while sufficient gas flows through gas conduit 15 to equalize the pressure between the upper and middle zones. In other embodiments not illustrated, a portion of the gas may flow through gas conduit 15 to another destination or simply be vented. In the embodiment illustrated in FIG. 3, valve 14 is closed and valve 12 is opened to re-establish the gas flow path of step 1 of that embodiment.

Figure 3:
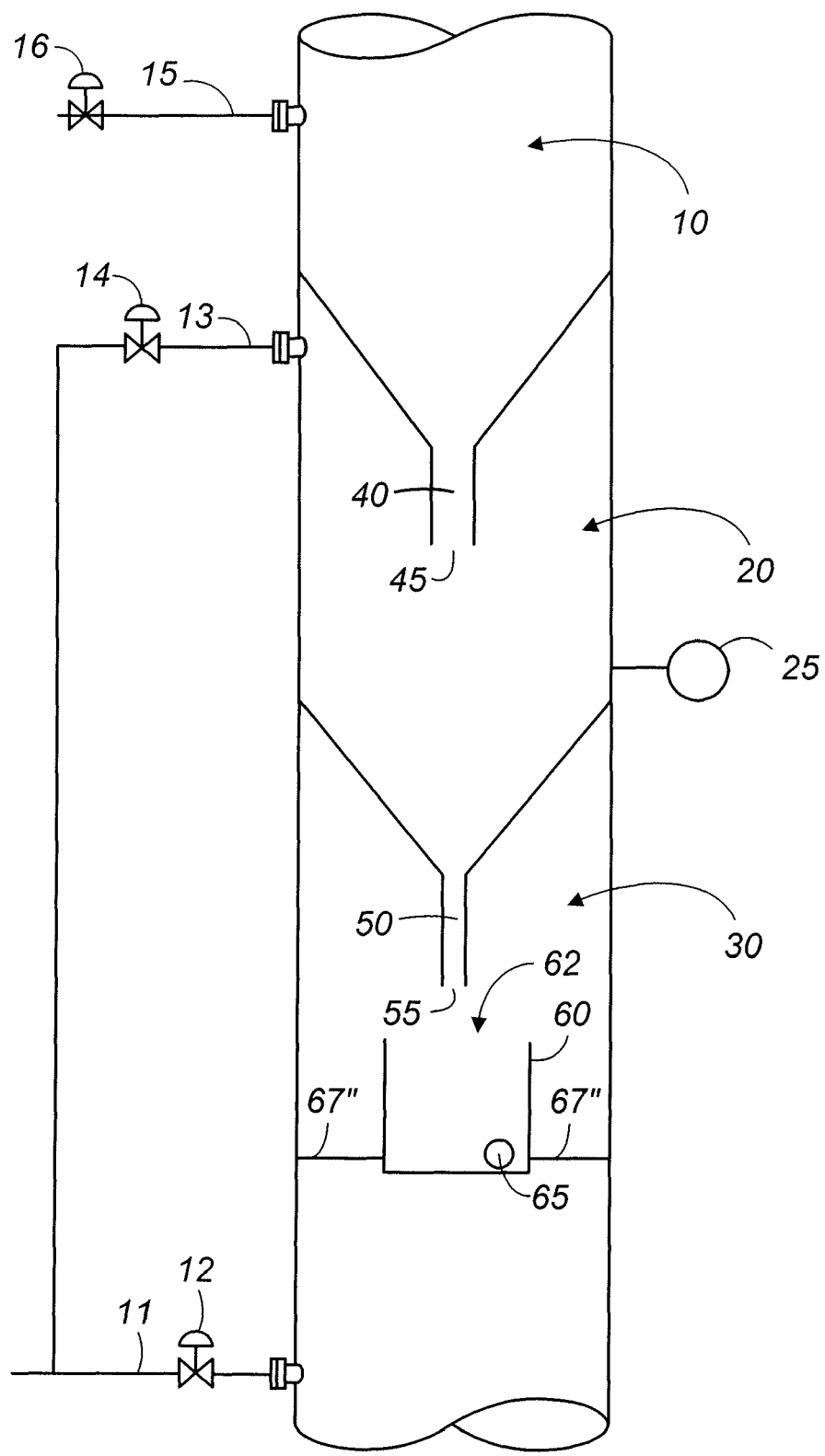
FIG. 3 illustrates another embodiment of the gas conduits encompassed by the invention and shows the zones of the apparatus within a single vessel.

When the pressure of middle zone 20 is decreased in step 4 to equilibrate with upper zone 10 and increased in step 2 to equilibrate with lower zone 30 it is understood that the pressures in the two zones, superior and inferior, being equilibrated may or may not be the same. For example, pressure differences may exist, if there is some gas flow between the two equilibrated zones, or if they are being controlled independently. Also, there is no requirement that the inferior zone be at the same or lower pressure than the superior zone of the two zones being equilibrated. That is, particles may transfer from either superior zone to the respective inferior zone even though the pressure of the inferior zone is higher than the pressure of the superior zone. The gas flow paths described for the embodiments of FIGS. 2 and 3 show that the invention may provide for the continuous flow of gas to each of the upper, middle, and lower zones throughout a cycle. Further, the embodiment of FIG. 2 provides an uninterrupted flow of gas from the lower zone through the middle zone and into the upper zone throughout the cycle. In other embodiments not illustrated, various gas conduits may be used to control the middle zone pressure and the gas flow rates through the upper and lower valveless particle transfer conduits to regulate the particle movement as herein described.

It is understood that the step numbers used herein are arbitrary and a transfer cycle may be considered to begin with any step and each step is employed at least once during a cycle. The invention encompasses various orders of the steps and some steps may be repeated in the course of transferring a single batch of particles from the upper zone to the lower zone. For example, the transfer of particles in steps 1 and/or 3 may be interrupted by employing steps 2 and 4 multiple times during a transfer cycle. Thus, in an embodiment, the order of steps may be 1—transfer particles from the upper zone to the middle zone; 2—increase the middle zone pressure to stop the transfer of particles; 4—decrease the middle zone pressure to equilibrate the middle and upper zone pressures; 1—transfer particles from the upper zone to the middle zone; 2—increase the middle zone pressure to equilibrate the middle and lower zone pressures; 3—transfer particles from the middle zone to the container within the lower zone; and 4—decrease the middle zone pressure to equilibrate the middle and upper zone pressures. In another embodiment the order of steps may be 1, 2, 4, 1, 2, 3, 4, 2, 3, and 4. Other steps such as purging the middle zone may be included in a transfer cycle.

Returning to the discussion of step 3. Container 60 is located within lower zone 30 to receive particles emerging from lower valveless conduit 50. Container 60 may be spaced apart from the inside surface of the lower zone and secured via one or more support elements 67. For example, the container may be suspended such as by wires or rods 67' in FIG. 2; fastened to or supported by relatively horizontal rails or beams 67" in FIG. 3; or located on a stand secured to a lower portion of the zone. Such supports which are known in the art may be used in any combination to locate the container 60 relative to the lower valveless conduit 50 as described herein. These support elements may in turn be secured to any inside surface of the lower zone or any other internal structures within the lower zone including lower valveless conduit 50. The container and support elements may be of the same or different material of construction suitable for the process conditions. In an embodiment, the support is of the same material of construction as that of the lower zone inside surface.

In the embodiments of FIGS. 1-3, container 60 is located below and spaced vertically apart from outlet 55 of the lower valveless conduit 50. Thus, particles may emerge or be discharged from outlet 55 of lower valveless conduit 50 and then pass to container 60 through inlet 62. The container is an open top cylindrical form with a solid bottom plate and outlet 65 located in a lower portion of the sidewall. Particles pass from container 60 through outlet 65 to the volume of lower zone 30 outside the container. In an embodiment, particles passing from container 60 through outlet 65 fall freely to a lower portion of lower zone 30. That is, the container may be located above and spaced apart from accumulated particles in lower zone 30. Lower valveless conduit 50 preferably extends into lower zone 30 as shown in FIG. 1, though this extension into lower zone 30 is not required.

FIGS. 4A-4D illustrate a few non-limiting configurations of the lower valveless transfer conduit 50 and the container 60 which are encompassed by the invention. Although the configurations differ, the same reference numerals are used to identify the corresponding elements in each Figure. The support element(s) are not illustrated in these views as they are not necessary for an understanding of the configurations. In an embodiment, the surfaces of the container are imperforate. In another embodiment, all or a portion of the surfaces may have uniform or non-uniform perforations. As used herein, "perforations" includes holes, gaps, slots, other openings, and combinations thereof which are sufficiently small to retain the particles while allowing gas to pass through the surface.

Figure 4A:
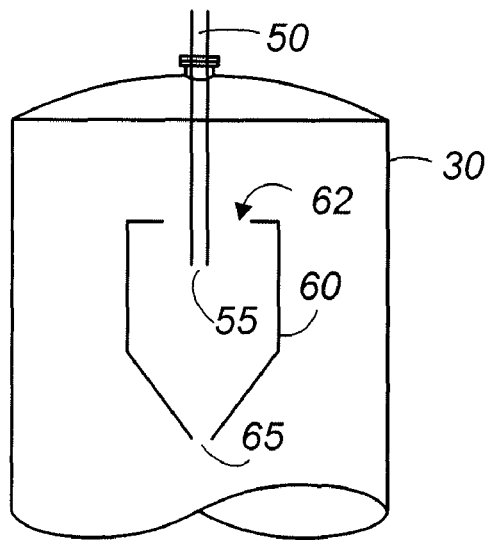
FIGS. 4A-4D and 5 illustrate various configurations of the lower valveless conduit and container that are encompassed by the invention.
Figure 4B:
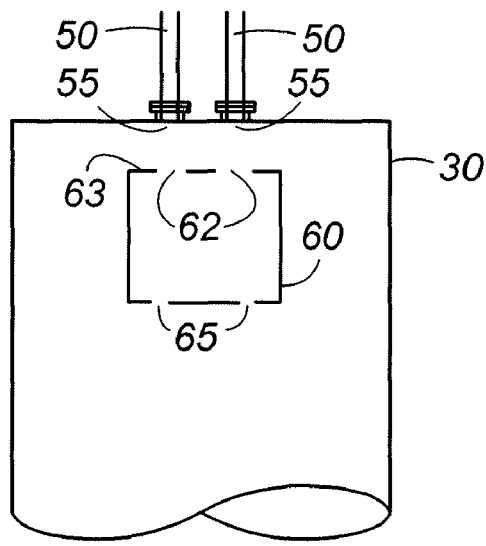
Figure 4C:
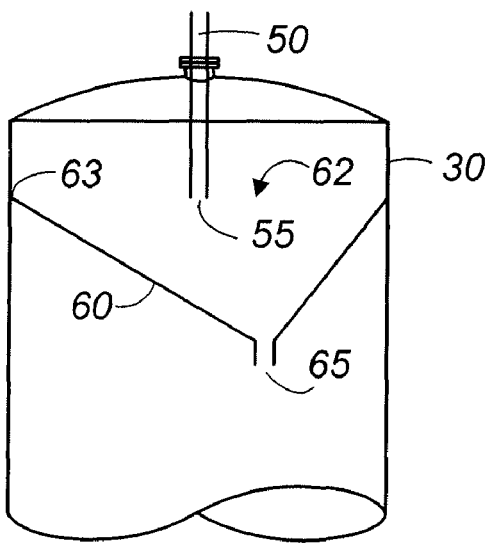
Figure 4D:
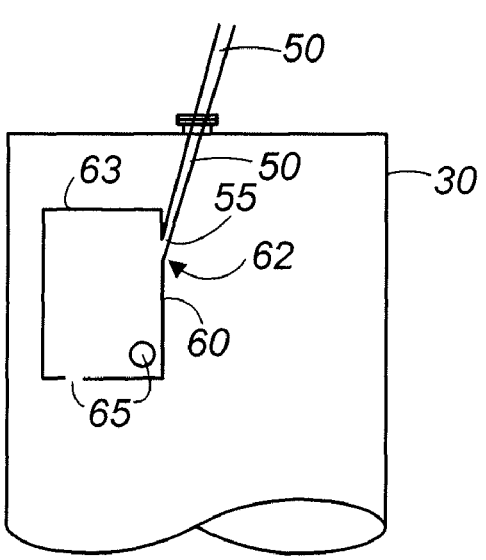

In the embodiment of FIG. 4A, container 60 has a square form the bottom surface of which is tapered towards outlet 65 located the lowermost portion of the container. Inlet 62 may be in the uppermost surface of the container, and the inlet permits the entry of particles where lower valveless conduit 50 extends through the inlet to discharge particles directly into the volume of the container. As shown in FIG. 4B, lower valveless conduit 50 need not extend into lower zone 30 and more than one such conduit may be used. Container inlet 62 may comprise multiple openings in the uppermost surface 63 of the container which is positioned to receive the particles. Container outlet 65 may comprise multiple openings in the lowermost surface of the container. There is no requirement that the number of conduits, inlet openings, and outlet openings be the same. FIG. 4C shows container 60 may be in the form of a funnel. The container surface or sidewall may also be a support element for the container by being extended and attached to the inside surface of the lower zone. The uppermost surface 63 of the container may be the top edge of a surface wall or sidewall of the container. As illustrated, the lower valveless conduit 50 may extend to the inlet of container 60 such that the lower valveless conduit and the container are not spaced vertically apart. As shown, a container may be asymmetrical. FIG. 4D shows that container inlet 62 is not required to be in the uppermost surface of the container. This embodiment also shows that the lower valveless conduit 50 need not be strictly vertical, but may be angled relative to true vertical. Also, a conduit may be tapered along its entire length or a portion thereof towards outlet 55. These non-vertical and tapering embodiments may also be used in upper conduit 40. Lower conduit 50 may be connected to container inlet 62. These conduit configurations may be used independently. When outlet 65 comprises multiple openings, the openings may be configured differently, e.g. be in different locations and have different sizes and shapes size. The container outlet has a cross-sectional area equal to the sum of the cross-sectional areas of each outlet opening. The cross-sectional area of the container inlet is determined in the same manner. Likewise, multiple inlet openings and conduits may be configured differently.

In an embodiment, container 60 has a top surface which is above an imaginary, horizontal plane that bisects the height of the container and a bottom surface which is below this imaginary plane. The container's height is the vertical distance between the uppermost and lowermost points of the container's surfaces. Container inlet 62 may be located in the top surface of the container. In an embodiment, the inlet is located in the uppermost portion of the top surface, i.e., the uppermost surface of the container. Container outlet 65 may be located in the bottom surface of the container. Particles are discharged or transferred from the container through the outlet into the volume of the lower zone outside the container. In an embodiment, the container outlet is located in the lowermost portion of the bottom surface, i.e., the lowermost surface of the container. When a container outlet is located in a particular surface, it is only necessary for one opening of the outlet to be in that surface. Other outlet openings, if any, may be located in the same surface or elsewhere. The same is true for the container inlet.

Container 60 may be fabricated in any shape sufficient to retain at least a portion of the particles discharged by lower valveless conduit 50 during step 3. Particles accumulate within container 60 during step 3 and reach a level to contact the lower valveless transfer conduit outlet 55. That is, container 60 and lower valveless conduit 50 are configured to form a continuous mass of particles between middle zone 20 and container 60 through lower valveless conduit 50 during a portion of the particle transfer cycle. The particle transfer rate from the middle zone may vary during step 3. For example, the continuous mass of particles may be formed during step 3 when the particle transfer rate from conduit 50 into the container is greater than the particle transfer rate from the container through outlet 65 to the lower zone volume outside the container. The particles may then continue to transfer from the middle zone to the container moving as a continuous mass, limited by the particle transfer rate out of the container. The level of particles retained by the container may then fall below conduit outlet 55 as the particle transfer rate from conduit 50 decreases. Similar to the transition to step 2 pressurization, particle transfer to the container may continue during a portion of step 4, depressurization. Also, particle transfer from the container to the volume of the lower zone outside the container may continue during at least a portion of step 4.

Figure 5:
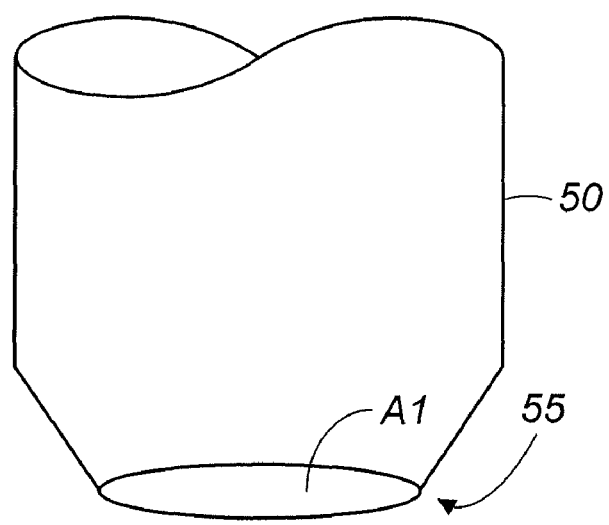
Figure 5:
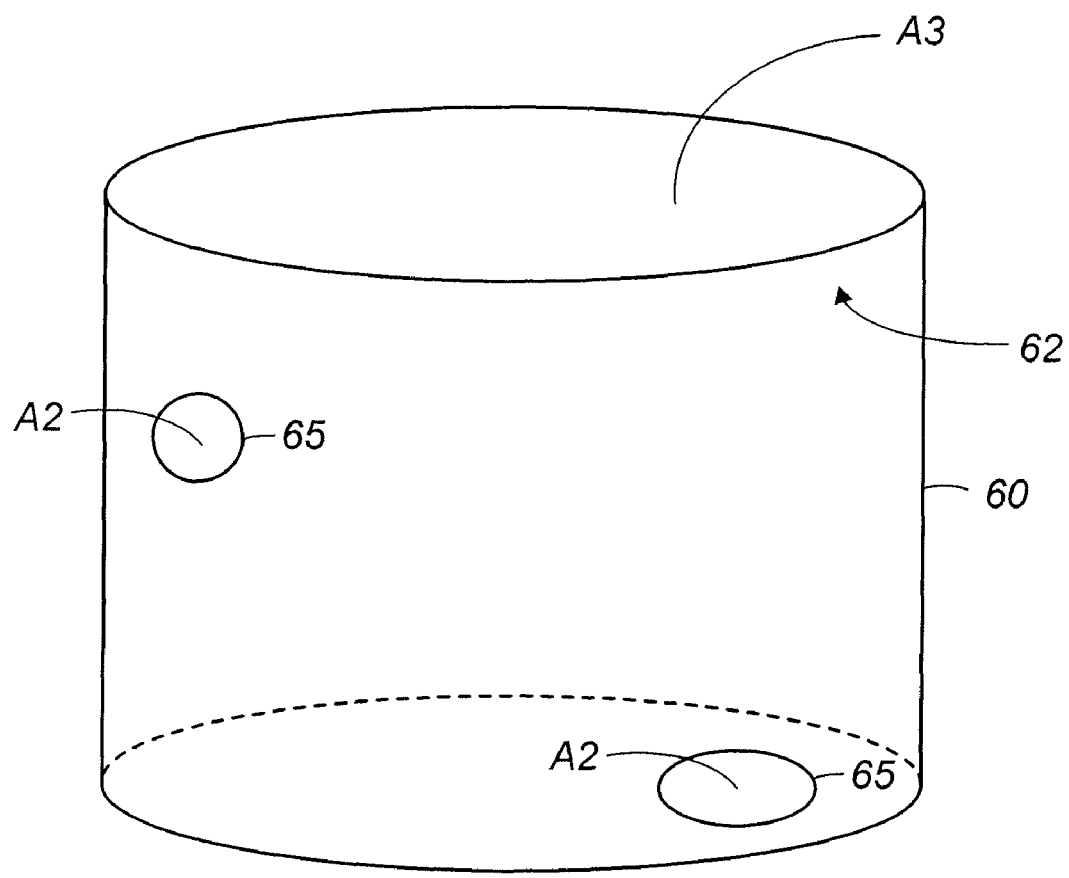

Container outlet 65 may be sized and configured to control the particle transfer rate from container 60 to the volume of lower zone 30 outside the container. For example, outlet 65 may comprise multiple openings of various shapes and cross-sectional areas arranged at different locations, such as various heights in the container surface. In an embodiment, the cross-sectional area, $A2$, of container outlet 65 is less than the minimum cross-sectional area of the lower valveless conduit 50. The particle transfer rate from the container through outlet 65 may be less than the particle transfer rate from the lower valveless conduit to the container. As shown in FIG. 5, the cross-sectional area, $A2$, of outlet 65, being the sum of the cross-sectional areas of the outlet openings, may be less than the cross-sectional area, $A1$, of lower valveless conduit outlet 55. In an embodiment, container inlet 62 has a cross-sectional area, $A3$, which is greater than the cross-sectional area, $A1$, of lower valveless conduit outlet 55. FIG. 5 illustrates that tapering of a valveless conduit towards the outlet does not require an extensive distance along the conduit.

The size of the container may be related to the batch size of particles transferred from the middle zone during a cycle of the method, i.e. the middle zone operating capacity less the volume of particles remaining in the middle zone when step 4 is initiated. The container may be smaller than the volume of a single batch of particles. For example, particles may flow out of the container as it is being filled and particles may form a mound above the container. The container may be larger than the particle batch volume such as when the lower valveless conduit extends into the container. As the particle batch size may vary, the minimum container volume may be related to the minimum particle batch size. The upper limit of the container volume is constrained by the design of the lower zone including the lower zone volume and the volume of particles to be maintained within the lower zone. In an embodiment, the volume of the container is at least about 30% of the minimum particle batch volume. The container volume may be at least about 60% of the minimum particle batch volume, and in another embodiment, the container volume is at least about the same as the minimum particle batch volume.

By regulating the particle transfer rates to and from container 60, the formation and continued existence of the continuous mass of particles from the middle zone to the container may be controlled. In an embodiment, this continuous mass of particles may exist for a portion of step 3. In another embodiment, the continuous mass of particles may exist for a portion of step 4; and the level of particles retained by container 60 may fall below the level of conduit outlet 55 before the beginning of step 1. Thus, particles may transfer from the container to the volume of lower zone 30 outside the container during step 4. In yet another embodiment, container 60 and outlet 65 are configured to essentially empty the container of particles before the subsequent step 3 begins such as by locating outlet 65 in the lowermost surface of container 60. That is, particles may occupy less than about 10% of the container volume when step 3 begins; and in an embodiment, particles occupy less than about 5% of the container volume at this time. Particles may occupy less than about 3% of the container volume when step 3 begins.

In an embodiment, particles may form a mound which contacts lower valveless conduit outlet 55. The mound may be wholly within container 60 or it may extend above container inlet 62 to reach conduit outlet 55. That is, the volume of particles retained by the container may be greater than the volume of the container. If particles mound above the container inlet, particles may fall or slide down the mound into the volume of the lower zone outside the container without passing through the container volume. Lower valveless conduit 50 provides particle communication to container 60; and lower valveless conduit 50 and container 60 may be in particle communication even if the lower valveless conduit and container are not connected. Container 60 and lower valveless conduit 50 may be spaced apart by a distance D. In an embodiment, the vertical distance, D, separating container inlet 62 and lower valveless conduit outlet 55 is less than about $1.15*R*\tan\theta$, where R is the effective radius of the cross-sectional area, A3, of the container inlet 62 and $\theta$ is the angle of repose of the particles. In another embodiment, D may be less about $1.07*R*\tan\theta$; and D may be less than about $R*\tan\theta$. The effective radius of the cross-sectional area of the container inlet is the radius of a circle having the same cross-sectional area of the container inlet. The angle of repose of the particles is a well known property of particles that is determined by depositing the particles on a horizontal surface with negligible velocity to form a pile. The angle formed between the slope of the pile and the horizontal surface is the angle of repose. See Andrew W. Jenike, Storage and Flow of Solids, Bulletin No. 123 of the Utah Engineering Experiment Station Sixth Printing (revised), March, 1970, University of Utah.

During the particle transfer cycle, the inventory in upper zone 10 may be continuously and/or intermittently replenished with particles such as from an associated or integrated process zone and/or as added from a fresh particle feed hopper. Likewise, particles delivered to lower zone 30 may be withdrawn from or pass out of the lower zone continuously and/or intermittently. It is preferred that an inventory or surge volume of particles be maintained in both the upper and lower zones throughout the particle transfer cycle. As previously described, upper zone 10 may also provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of upper zone 10 may be independently controlled by means well known in the art. For example, upper zone 10 may be in fluid communication with a process zone so that the upper zone pressure depends upon and varies with the pressure in that process zone. The upper zone pressure is not critical and may be atmospheric, sub-atmospheric, or super atmospheric.

Lower zone 30 may be a holding vessel, or surge zone from which the particles are transferred by other means such as pneumatic conveying. In other embodiments, lower zone 30 may provide one or more functions of an associated or integrated process unit including regeneration zones. Non-limiting examples include: a particle feed hopper, a reaction zone, an atmosphere purge zone, another catalyst transfer zone, a reduction zone, and an elutriation zone. The internal pressure of lower zone 30 may be independently controlled by means well known in the art. For example, lower zone 30 may be in fluid communication with a process zone so that the lower zone pressure depends upon and varies with the pressure in that process zone. In an embodiment, the upper zone pressure may be higher than the lower zone pressure for a portion of the transfer cycle. In another embodiment, lower zone 30 may be maintained at a higher pressure than upper zone 10. For example, upper zone 10 may be maintained at a nominal pressure of 34 kPa (g) and permitted to vary within a range from about 14 to about 55 kPa (g) while the nominal pressure of lower zone 30 may be 241 kPa (g) within a range from about 207 to about 276 kPa (g). In another embodiment, upper zone 10 may be maintained at a nominal pressure of 241 kPa (g) and permitted to vary within a range from about 172 to about 310 kPa (g) while the pressure of lower zone 30 may be within a range from about 345 to about 2068 kPa (g). Thus, the differential pressure between the lower zone 30 and upper zone 10 might range from about 35 to about 1896 kPa. However, this invention may be used when the pressure differential between zones is as little as about 0.7 kPa and in excess of 2000 kPa. Middle zone 20 serves as an intermediate zone, and its nominal pressure is adjusted to regulate the flow of the particles.

The apparatus of the invention may be used as a solids flow control device for an entire process, since the flow rate of particles from the upper zone to the lower zone can be varied, as discussed above. The upper, middle, and lower zones may contain other non illustrated apparatus known in the art such as baffles, screens, and deflector cones which may be used to facilitate particle flow and/or direct the particles or the gas through a zone in a desired manner. The components of the present invention may be fabricated from suitable materials of construction, such as metals, plastics, polymers, and composites known to the skilled artisan for compatibility with the particles, and operating conditions, e.g. gas, temperature, and pressure. The size, shape, and density of the particles is only limited by the size of the equipment and the type and flow rates of the gas or gases used. In an embodiment, the particles are spheroidal and have a diameter from about 0.7 mm to about 6.5 mm. In another embodiment, the particles have a diameter from about 1.5 mm to about 3 mm. The particles may be catalysts an example of which is disclosed in U.S. Pat. No. 6,034,018.

As previously noted, particle transfer apparatus of the prior art may be adapted to incorporate the invention. Likewise, standard engineering principles especially those related to the flow of solids and gases and known design methods may be used in this invention. In addition to the teachings herein, the design considerations and methodology described in U.S. Pat. No. 4,576,712 and U.S. Pat. No. 4,872,969 may be used to practice this invention. For example, the pressure in the upper and lower zones, the minimum and maximum gas flow rates upwards through the zones and the valveless conduits, and the required particle transfer rate are design factors that are often fixed by the associated process unit. The length of the particle column inside the valveless conduit, the height of particles in the zone above the valveless conduit, and the diameter of the conduit may be balanced so that changing the pressures and gas flow paths as described herein controls whether particles will flow down through or be retained within the conduit. The design method includes limiting the gas flow rates and pressure differentials to avoid fluidizing particles within the zones and to prevent particles from being suddenly forced up or down the valveless conduits. It is well known to those skilled in the art in design of solids flow systems to conduct experiments to determine flow characteristics of the particular solid involved.

Thus, it is known that the internal pressures of the upper and lower zones, the minimum and maximum gas flow rates, the identities of the gas and the particles, and the required range of particle transfer rates, may be used to determine various parameters of the invention. These parameters include: the normal minimum and maximum volumes occupied by the particles in the zones, the particle heights required in the zones above the transfer conduits, the diameter of the transfer conduits, and the lengths of the transfer conduits. These and other parameters such as the gas conduit size and arrangement may characterize a particular embodiment encompassed by the invention.

The invention claimed is:

1. A method for transferring particles from an upper zone, through a middle zone, to a lower zone comprising:
   (a) introducing a first gas stream into the lower zone;
   (b) transferring particles downward from the upper zone to the middle zone through an upper valveless conduit, and transferring gas from the lower zone upward through a lower valveless conduit into the middle zone;
   (c) increasing the middle zone pressure;
   (d) transferring particles downward from the middle zone, through the lower valveless conduit to a container within the lower zone, and transferring gas from the middle zone upward through the upper valveless conduit into the upper zone;
   (e) decreasing the middle zone pressure;
   (f) transferring particles from the container to a volume of the lower zone outside the container; and
   (g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

2. The method of claim 1 further comprising maintaining an inventory of particles in the upper zone, and maintaining an inventory of particles in the lower zone.

3. The method of claim 1 further comprising sensing the level of particles in the middle zone, and transmitting a signal to initiate step (e).

4. The method of claim 1 wherein at least portions of steps (e) and (f) are simultaneous.

5. The method of claim 1 wherein particles transferred to the container are discharged from an outlet of the lower valveless conduit and then pass through an inlet of the container.

6. The method of claim 1 wherein particles transferred to the container are discharged from an outlet of the lower valveless conduit, the outlet being located within the lower zone.

7. The method of claim 1 wherein particles transferred to the container are discharged from an outlet of the lower valveless conduit, the outlet being located within the container.

8. The method of claim 1 wherein the pressure in the middle zone is greater than a pressure in the upper zone during at least a portion of step (c).

9. The method of claim 1 further comprising during step (d) forming a continuous mass of particles comprising particles in the middle zone, particles in the lower valveless conduit, and particles in the container.

10. The method of claim 9 wherein the continuous mass of particles exists when step (e) is initiated.

11. The method of claim 1 wherein particles are transferred from the middle zone, through the lower valveless conduit, to the container at a first rate, and particles are transferred from the container to the volume of the lower zone outside the container at a second rate wherein the first rate is greater than the second rate.

12. The method of claim 1 further comprising introducing a second gas stream to the middle zone to increase the middle zone pressure in step (c) and venting gas from the middle zone to the upper zone through the upper valveless conduit in step (e).

13. The method of claim 1 further comprising transferring at least a portion of gas from the lower zone to the middle zone through a first gas conduit to increase the middle zone pressure in step (c), and venting gas from the middle zone through a second gas conduit in step (e).

14. The method of claim 13 wherein the middle zone is vented through the second gas conduit to the upper zone in step (e).

15. The method of claim 1 wherein during step (c) the middle zone pressure is equilibrated with the lower zone pressure, and during step (e) the middle zone pressure is equilibrated with the upper zone pressure.

16. A method for transferring particles from an upper zone, through a middle zone, to a lower zone comprising:
   (a) introducing a first gas stream into the lower zone;
   (b) transferring particles downward from the upper zone to the middle zone through an upper valveless conduit, transferring gas from the middle zone to the upper zone through the upper valveless conduit, and transferring gas from the lower zone upward through a lower valveless conduit into the middle zone;
   (c) introducing a second gas stream to the middle zone to increase the middle zone pressure;
   (d) transferring particles downward from the middle zone, through the lower valveless conduit, to a container located in the lower zone, and transferring gas from the middle zone upward through the upper valveless conduit into the upper zone;
   (e) venting the middle zone to the upper zone through the upper valveless conduit to decrease the middle zone pressure;
   (f) transferring particles from the container to a volume of the lower zone below the container; and
   (g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

17. The method of claim 16 further comprising during step (d) forming a continuous mass of particles comprising particles in the middle zone, particles in the lower valveless conduit, and particles in the container.

18. A method for transferring particles from an upper zone, through an middle zone, to a lower zone comprising:
   (a) introducing a first gas stream into the lower zone;
   (b) transferring particles downward from the upper zone to the middle zone through an upper valveless conduit, and transferring gas from the lower zone upward through a lower valveless conduit into the middle zone;

(c) transferring at least a portion of the gas from the lower zone to the middle zone through a first gas conduit to increase the middle zone pressure;

(d) transferring particles downward from the middle zone through the lower valveless conduit to a container located in the lower zone, and transferring gas from the middle zone upward through the upper valveless conduit into the upper zone;

(e) venting the middle zone through a second gas conduit to decrease the middle zone pressure;

(f) transferring particles from the container to a volume of the lower zone below the container; and (g) controlling the transfer of particles by use of at least one of a controller, a particle level sensor, a pressure gauge, a pressure indicator, a differential pressure sensor, and a timer wherein the upper zone is at a first pressure, the lower zone is at a second pressure, and the second pressure is greater than the first pressure.

19. The method of claim 18 wherein the middle zone is vented through the second gas conduit to the upper zone.

20. The method of claim 18 further comprising during step (d) forming a continuous mass of particles comprising particles in the middle zone, particles in the lower valveless conduit, and particles in the container.

* * * * *